C. E. SKELTON.
REAMER.
APPLICATION FILED MAR. 28, 1919.

1,397,706.

Patented Nov. 22, 1921.

CHARLES E. SKELTON  INVENTOR.

BY Parsons & Podell
ATTORNEYS.

UNITED STATES PATENT OFFICE.

CHARLES E. SKELTON, OF EAST ONONDAGA, NEW YORK.

REAMER.

1,397,706.      Specification of Letters Patent.      Patented Nov. 22, 1921.

Application filed March 28, 1919. Serial No. 285,735.

*To all whom it may concern:*

Be it known that I, CHARLES E. SKELTON, a citizen of the United States, and a resident of East Onondaga, in the county of Onondaga and State of New York, have invented a certain new and useful Reamer, of which the following is a specification.

My invention relates to reamers and has for its object a reamer of the class set forth in my pending application, executed of even date herewith, Sr. No. 285,734, filed March 28, 1919, in which the angle of the bottom of the groove forming the cutting edge is arranged at the same angle to the face of the reamer in which the groove is formed throughout the entire length of the cutting edge.

The invention consists in the novel features hereinafter set forth and claimed.

In describing this invention, reference is had to the accompanying drawings in which like characters designate corresponding parts in all the views.

Figure 1:
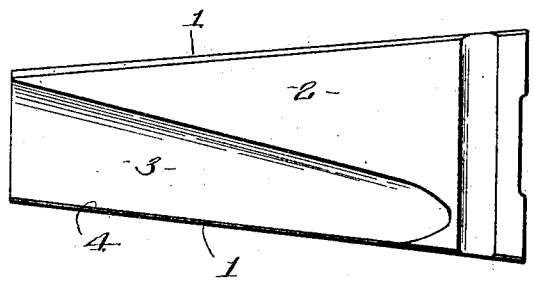
Figures 1 and 2 are respectively a plan and a side elevation of my reamer.
Figure 2:
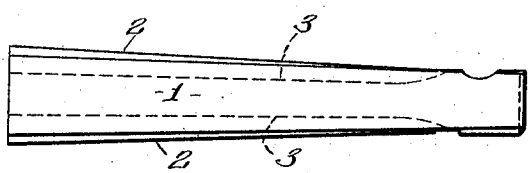
Figure 3:
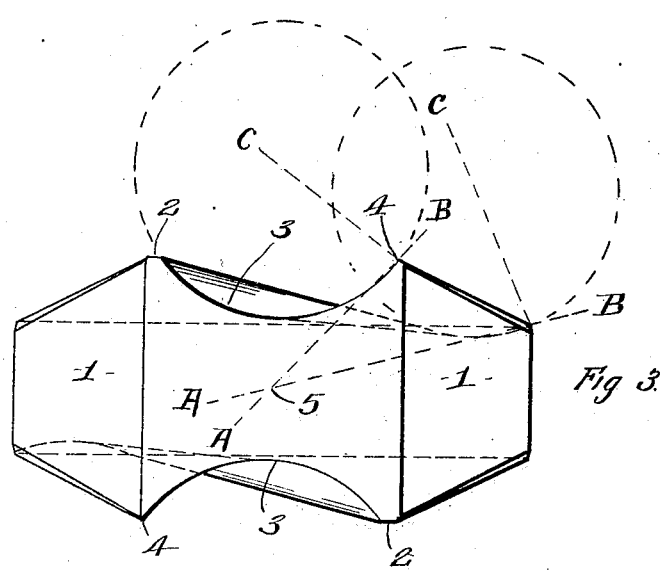
Fig. 3 is an end view thereof.

This reamer is formed with sides 1 tapering from one end of the reamer toward the other, and faces 2 arranged at an angle to the face 1 and tapering from the latter end toward the former end so that the reamer is of greater thickness at its outer end than at its inner end. In other words, the inner end of the reamer is in the general form of an oblong while the outer end is in the general form of a square of less diameter than the long diameter of the oblong but of greater diameter than the short diameter of the oblong.

Although the reamer here shown is of double construction, it may be of single construction and formed with one cutting edge and one groove to form said edge.

Each face 2 is formed with a groove 3 which intersects said face 2 near the angle formed by the planes of the sides 1 and 2 to form the cutting edge 4, this groove decreasing in depth from the outer or square end of the reamer toward the inner or oblong end.

The angles formed at either end of the reamer or in any intermediate point throughout the reamer by lines or planes A, B and B—C radial with the axis of rotation 5 of the reamer and tangent to the cutting edge 4 and radial with the center of the arc of the groove 3 and intersecting the former lines or planes, are the same throughout the length of the reamer.

What I claim is:

1. A reamer having a tapering side, and a tapering face meeting said side near the cutting edge of the reamer whereby the reamer is wider at one end than at the other and is thicker at its narrower end than at its wider end, said face being formed with a cylindrical groove intersecting the same to form the cutting edge, the groove decreasing in depth from its narrower and thicker end toward its wider and thinner end, the groove intersecting said face to form the cutting edge to the surface operated upon at the same angle at all points between the ends of the cutting edge, substantially as and for the purpose set forth.

2. A reamer having a tapering side, and a tapering face meeting said side near the cutting edge of the reamer whereby the reamer is wider at one end than at the other and is thicker at its narrower end than at its wider end, said face being formed with a cylindrical groove intersecting the same to form the cutting edge, the groove decreasing in thickness from its narrower and thicker end toward its wider and thinner end, the bottom of the groove intersecting said face to form the cutting edge at the same angle at all points between the ends of the cutting edge, the center of the arc of the groove being so arranged relatively to the axis of rotation of the reamer that lines or a plane radial with the axis of rotation of the reamer and tangent to the cutting edge, are arranged at the same angle at all points along the cutting edge to radial lines or a plane radial with the axis of the arc of the groove and intersecting the former lines or plane at the cutting edge, substantially as and for the purpose described.

In testimony whereof I have hereunto signed my name, at Syracuse, in the county of Onondaga, and State of New York, this 26th day of February, 1919.

CHARLES E. SKELTON.